Dec. 2, 1969      B. D. LINEBERG      3,481,182
METHOD AND APPARATUS FOR MEASURING WATER IMPURITIES IN OIL
Filed April 20, 1966
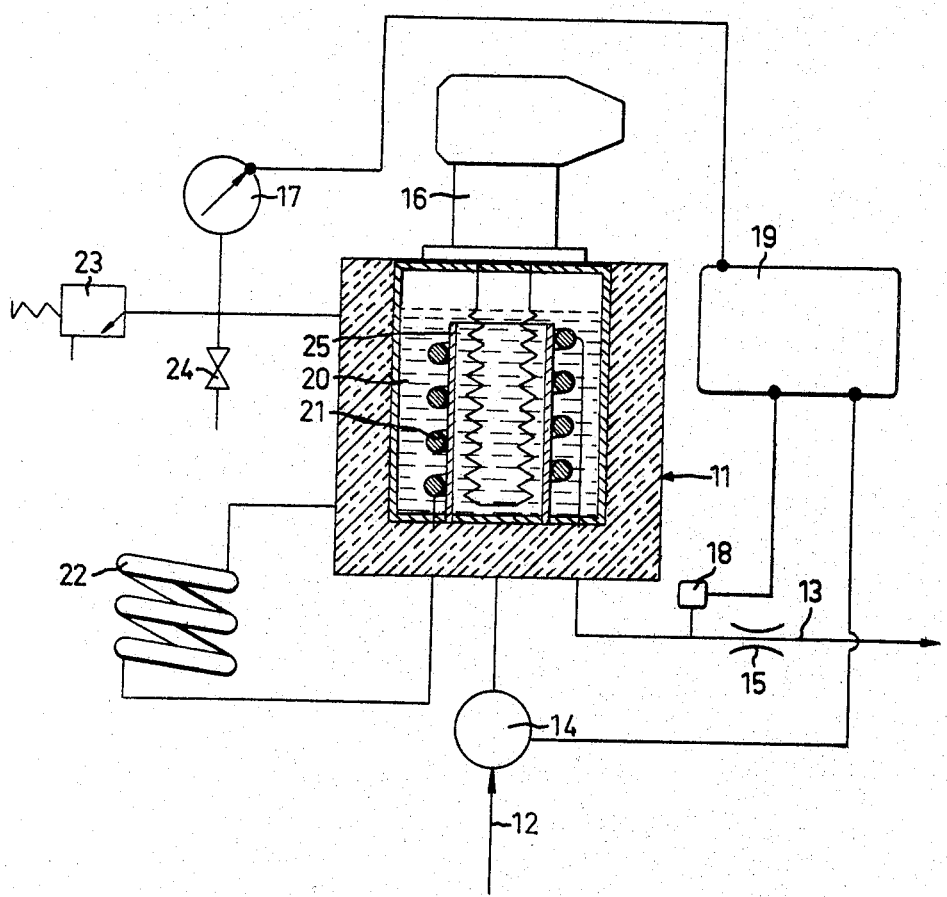

United States Patent Office 3,481,182
Patented Dec. 2, 1969

3,481,182
METHOD AND APPARATUS FOR MEASURING
WATER IMPURITIES IN OIL
Birger David Lineberg, Ekorrvagen 7, Koping, Sweden
Filed Apr. 20, 1966, Ser. No. 544,030
Claims priority, application Sweden, Apr. 22, 1965,
5,221/65
Int. Cl. G01n 11/00, 25/56, 5/02
U.S. Cl. 73—61.1  2 Claims

ABSTRACT OF THE DISCLOSURE

A method of measuring water impurities in oil comprises causing the oil in a confined space to take a temperature exceeding the evaporation temperature of water. The change of state thus brought about is a measure of the prevailing water impurity.

---

This invention relates to a method of measuring water impurities in oil. It is especially suited for use in such cases where oil is to be exploited at elevated temperatures. As is well known, water impurities may occasion operating trouble when the working temperature of the oil is higher than the evaporation temperature of water.

It should be mentioned by way of example that fuel oil must not be preheated to temperatures higher than 80–90° C. owing to the risk of evaporation, although it would be desirable for combustion technical reasons to preheat the oil to a temperature exceeding 100° C. In the event that the oil is contaminated by water and is heated over the evaporation temperature of water the resulting increase of pressure might be so great as to burst the piping.

In the technique of heat treatment use is made of quenching media at temperatures over 100° C. Should water penetrate into the quenching medium there occurs in this case a violent steam generation which results in discharge of oil and great risks of fire. Also when the normal working temperature of the quenching medium is lower than 100° C. there are great risks of overboiling if water is present in the medium, e.g. when products to be hardened are quenched, in which case the temperature of the medium locally exceeds 100° C.

The present invention has for its object to eliminate the abovementioned drawbacks. To bring about this the invention relates to a method in which the oil is heated in a closed spaced to a temperature exceeding the evaporation temperature of water, the pressure increase resulting from the heating being a measure of prevailing water impurities. Should the resulting pressure increase exceed the permissible limit the oil must not be used at the contemplated temperature, the indication of the pressure increase being exploited for eliminating the risk in a suitable way, for example by interrupting the procedure, or the oil has to be subjected to a treatment by which the water impurities are removed and/or neutralized. This can be realized for example by heating whereby the water impurities are evaporated.

The invention is concerned with an apparatus for practising the measuring of water impurities in oil.

The above and further features of the invention will become apparent from the following detailed description in which reference is made to the accompanying drawing in which:

The figure illustrates an embodiment chosen by way of example of the apparatus according to the invention.

In the embodiment illustrated in the figure the chamber is designated 25, the inlet 12 and the outlet 13. The inlet 12 is equipped with a robust and reliable pump 14 which is arranged to pump the oil into the chamber 25 where it is heated to more than 150° C. whereupon it flows through an outer chamber 20 and a cooler 22 and the intermediate chamber 21 and out through the outlet 13 in which the precision valve 15 is disposed. The well-insulated chamber 11 is equipped with the heating cartridge 16 which is automatically regulated to the temperature set. A device for protection against both excessive heating and insufficient heating is arranged for the cartridge 16.

A pair of pressure gauges 17, 18 are adapted at pressure increases to supply pulses to an alarm device in an electric equipment 19 associated with the apparatus and at a predetermined measure of the prevailing water impurities to stop the pump 14.

The pressure increase is primarily measured in the outer chamber 20 by the pressure gauge 17 and secondarily in an intermediary chamber 21 comprising a coil by the pressure gauge 18 after intervening cooling, whereby very small amounts of water can be determined. When the water impurities are so small, less than 0.5% that no pulse is primarily obtained the water is nevetheless evaporated and collected in the outer chamber 20 which has a very small volume compared to the inner chamber 25 so that the steam very fast can displace the oil in this outer chamber and the oil may leave this outer chamber to be condensed in the cooler 22 which is either a heat exchanger or a cooling coil and to be returned to concentrated form to the test chamber 20, more particularly to the intermediary chamber 21 where the secondary measuring takes place. Thus the water can never flow through the apparatus.

The outer chamber 20 comprises an inner chamber 25 which is a vertical pipe which is open at the top and in which the heating cartridge 16 is disposed. Said pipe is located in the outer chamber 20 from which the outlet extends, while the inlet opens into the lower end of the vertical pipe.

A safety valve 23 provides protection against unexpected pressure increases, and a valve 24 serves to regulate the oil level at the start of the apparatus.

The precision valve 15 is adapted to throttle the outlet to such an extent that a necessary pressure increase is obtained for a certain amount of water in the oil, for example less than 0.2%.

While one embodiment of the invention has been described for purposes of illustration in the foregoing it will be obvious to those skilled in the art that various changes can be made without departing from the scope of the invention defined in the appended claims.

What I claim and desire to secure by Letters Patent is:
1. An apparatus for measuring of water impurities in oil in a confined space comprising an inner chamber formed as a vertical pipe open in the upper end with oil inlet at the lower end where the oil is heated by a heating cartridge having an automatic regulation to a tempera- ture exceeding the vaporization temperature of said impurities, and an outer closed chamber enclosing the inner chamber, and said outer chamber having an oil outlet connected over a cooler to an intermediary chamber in said closed outer chamber, and said intermediary chamber having an oil outlet, and means for measuring the pressure increase in said apparatus resulting from heating of the oil.

2. An apparatus in accordance with claim 1 wherein both said outer chamber and said intermediary chamber are provided with means for measuring the pressure increase resulting from the heating of the oil.

References Cited

UNITED STATES PATENTS

| 2,299,899 | 10/1942 | Houghland | 73—61.3 |
| 2,571,470 | 10/1951 | Milligan | 73—61.1 |
| 3,276,460 | 10/1966 | Feld | 73—53 |

RICHARD C. QUEISSER, Primary Examiner

C. E. SNEE III, Assistant Examiner

U.S. Cl. X.R.

73—73